(12) United States Patent
Furman

(10) Patent No.: US 6,308,662 B1
(45) Date of Patent: Oct. 30, 2001

(54) ANIMAL LEASH

(76) Inventor: Shulim Furman, 1903 Bonaventure Way, Marietta, GA (US) 30068

( * ) Notice: Subject to any disclaimer, the term of this patent is extended or adjusted under 35 U.S.C. 154(b) by 0 days.

(21) Appl. No.: 09/569,495

(22) Filed: May 11, 2000

(51) Int. Cl.[7] .................................................. A01K 1/08
(52) U.S. Cl. ............................ 119/776; 119/772; 119/778
(58) Field of Search ..................................... 119/795, 769, 119/772, 774, 791, 793, 801, 776, 777; 54/69

(56) References Cited

U.S. PATENT DOCUMENTS

| Re. 34,351 | * | 8/1993 | Lacey | 119/779 |
|---|---|---|---|---|
| 937,800 | * | 10/1909 | Hazzard | 119/776 |
| 2,821,169 | * | 1/1958 | Barhorst | 119/776 |
| 3,540,089 | * | 11/1970 | Franklin | 119/776 |
| 4,903,638 | * | 2/1990 | Lacey | 119/776 |
| 5,103,771 | * | 4/1992 | Lee | 119/110 |
| 5,125,365 | * | 6/1992 | Bonilla | 119/110 |
| 5,197,410 | * | 3/1993 | Wilson et al. | 119/776 |
| 5,813,368 | * | 9/1998 | Radmussen | 119/776 |
| 6,053,129 | * | 4/2000 | Akre | 119/795 |
| 6,230,663 | * | 5/2001 | Welch et al. | 119/772 |
| 6,247,427 | * | 6/2001 | DeBien | 119/776 |

* cited by examiner

Primary Examiner—Charles T. Jordan
Assistant Examiner—Judith A. Nelson
(74) Attorney, Agent, or Firm—Eric R. Katz

(57) ABSTRACT

An improved animal leash is disclosed that improves a handler' control over a leashed animal and is easily attached to and quickly released from an animal in a manner that safeguards against unintentional unleashing of the animal. The improved animal leash comprises: 1) a rigid or semi-rigid shaft; 2) two hand grips, a pistol grip being located at a distal end of the rigid shaft and a hand grip located at the proximal end of the rigid shaft; 3) a quick release and attachment connector connecting an animal collar fastener to the rigid shaft to the proximal end of the rigid shaft; 4) a release button at the pistol grip for releasing the quick release connector from the shaft; and 5) a safety at the hand grip at the proximal end of the shaft for preventing the inadvertent release of the connector if the push button is pressed.

21 Claims, 6 Drawing Sheets

ANIMAL LEASH

BACKGROUND OF THE INVENTION

1. Field of the Invention

The present invention generally relates to an animal leash, and more particularly, to an animal leash that improves a handler'control over a leashed animal and is easily attached to and quickly released from an animal in a manner that safeguards against unintentional unleashing of the animal.

2. Background Discussion

The number of pets in highly populated localities, such as towns, cities and the surrounding suburbs, is quite significant and as a result prudent civil conduct dictates the use of leashes to retain pets when they are outside to minimize detrimental pet/human interaction. In addition, many localities have laws that require pet owners to have their pets on a leash when they take them outside for a walk although limited open areas are sometimes designated as runs for pets in parks or on the beach. Moreover, the leash is very useful in training pets to be obedient. As a result of the foregoing, it is fairly common for pet owners to own a leash in order to take their pets outside or to train them.

The legal requirement for leashing pets is of significant importance to and a substantial liability for dog owners. Pet owners can be fined significant amounts of money for not having their pets on a leash and may incur criminal and civil liability if their pet hurts or kills someone because the pet was not on a leash.

Because many pets, such as dogs, must be let out of the house on a regular basis for exercise as well as sanitation reasons, the control of the pet while leashed is of considerable important to pet owners and/or animal handlers. However, known leash designs do not always provide an animal handler with the type of control necessary to properly manage a leashed animal, such as a dog.

A good example of a leash design that has deficiencies is the flexible leash, such as a rope leash having a loop at one end that is held by the handler and a spring loaded clip or hook at the other end which is attached to the animal'collar. Due to the slack inherent to the flexible leash, the leashed animal can make a short dash away from the handler, for example, chasing after a moving object such as a cat or a car, before the leash acts to restrain the animal. In such circumstances, the animal is afforded the opportunity to build up a certain amount of momentum before being restrained and the animal can jerk or pull the animal handler off balance. If the animal is powerful enough, this can result in a situation where the handler is pulled around uncontrollable by the animal or the animal may break free from the handler altogether.

Moreover, the flexibility of this type of leash does not permit the handler to apply a lateral force to the animal, only a pulling force. As a result, the animal cannot be easily controlled by the handler using a flexible leash. As a result, the flexible leash does not provide the kind of control required for good safety or to properly train an animal.

In addition to the foregoing deficiencies, the use of a spring-loaded clip or hook to attach the leash to the collar of the animal makes it difficult to quickly and easily attach the pet to and release the pet from the leash. In particular, the spring-loaded clip typical has a small protuberance usually made of metal that the animal handler must move against the bias of a fairly strong spring in order to open the clip. Due to the small size and slick surface of the metal protuberance, it is quite possible for the finger of the handler to slip off of the protuberance as it is being slid back. In addition, due to the strength of the spring bias, it is difficult and often painful to hold the clip open while attaching or releasing the pet from the leash. Moreover, some pet owners due to age or other infirmaries simple cannot readily manipulate the conventional latch of a leash.

Further, the spring-loaded clip must be hooked around the collar for attachment and unhooked from the collar for release and if the animal is straining or pulling away from the handler during this process, the result is not only a great deal of difficulty in accomplishing the task but also the possibility for the unintentional release of the animal.

In addition to the foregoing, there are many situations where it is desirable to release an animal from a leash quickly, as for example in working with police dogs, security dogs or hunting dogs or if a person is being attacked and uses the dog in defense.

SUMMARY OF THE INVENTION

It is therefore an object of the present invention to provide an improved animal leash that overcomes the deficiencies of the prior art leashes.

Yet another object of the present invention is to provide an improved animal leash that permits the quick release and easy attachment of the leash to a collar.

A further object of the present invention is to provide an improved animal leash that minimizes the possibility for the unintentional release of a leashed animal.

Still another object of the present invention is to provide an improved animal leash that enhances the command of an animal handler over a leashed animal and thereby improves safety when walking the animal on the leash and the ability to train a pet due to the increased the control of an animal handler over a leashed pet.

Yet another object of the present invention is to provide an improved animal leash that is relatively inexpensive and easy to manufacture.

An important advantageous feature of the present invention is the use of an elongated leash shaft that is rigid or substantially rigid to provide greater control of the animal during training and while walking. The rigid shaft allows the handler to keep the dog away from this body and legs as well as increasing control of the dog in crowded areas where the dog may try to lunge at a moving object. As a result, the ability of the animal to build-up a certain amount of momentum before being restrained is eliminated.

Another advantageous feature of the present invention is the use of customized handholds positioned at the ends of the rigid leash shaft that are shaped to further enhance the control of the animal handler over the leashed animal and to prevent unintentional release of the animal.

Yet another advantageous feature of the present invention is that it is includes an attachment and release mechanism for quickly and easily attaching an animal to and releasing an animal from a leash in a manner that safeguards against unintentional unleashing of the animal. In this regard, the improved animal leash of the present invention includes an arrangement that permits the animal handler to release a leashed animal with the press of a button. To safeguard against the unintentional release of the animal, the present invention includes a safety that prevents the unleashing of the animal even if the release button is pushed or activated when the safety is on.

Still another advantageous feature of the present invention is that it can be constructed of materials that are relatively light weight and yet strong, such as, for example, aluminum, copper, stainless steel, fiber glass, graphite, and plastics such as teflon, nylon, polyethylene, polypropylene as well as rubber or wood. In addition, these material permit the use of a variety of different construction techniques, such as the use of solid or tubular shaft construction, which can further reduce the weight of the animal leash and still preserve the strength needed to maintain good control over the leashed animal.

Yet another advantage of the present invention is that material used to construct the leash can be decorated with colors or lights to enhance the overall appearance of the leash.

These and other objects, advantages and features of the present invention are achieved, according to one embodiment thereof, by an improved animal leash having: 1) a rigid or semi-rigid shaft which can be extendable; 2) two hand grips, a pistol grip being located at a distal end of the rigid shaft and a hand grip located at the proximal end of the rigid shaft; 3) a quick release and attachment connector connecting an animal collar fastener to the rigid shaft to the proximal end of the rigid shaft; 4) a release button at the pistol grip for releasing the quick release connector from the shaft; and 5) a safety at the hand grip at the proximal end of the shaft for preventing the inadvertent release of the connector if the push button is pressed when the safety is on.

According to a further embodiment of the present invention, the quick release connector comprises a ball detent mechanism actuated by a push button.

In yet another embodiment of the present invention, the animal collar fastener comprises a convention spring-loaded hook having a small protuberance made of, for example, metal that the animal handler moves against the bias of a fairly strong spring in order to open the hook. In order to improve operation of this spring-loaded hook, the present invention proposes the use of an overlay button that is force-fitted over the metal protuberance of the spring-loaded hook to assist in the opening of the hook by increasing the size and friction grip of the protuberance. Thus, this feature of the present invention is adapted for easy retro-fit to existing animal leashes which use the spring-loaded hook for attachment of the leash to a collar.

The foregoing and other objects, advantages and features of the present invention will no doubt become more apparent to those skilled in the art after having read the following detailed description of the preferred embodiments of the present invention, which are contained in and illustrated by the various Drawing Figures.

DETAILED DESCRIPTION OF THE PREFERRED EMBODIMENT(S)

Figure 1:
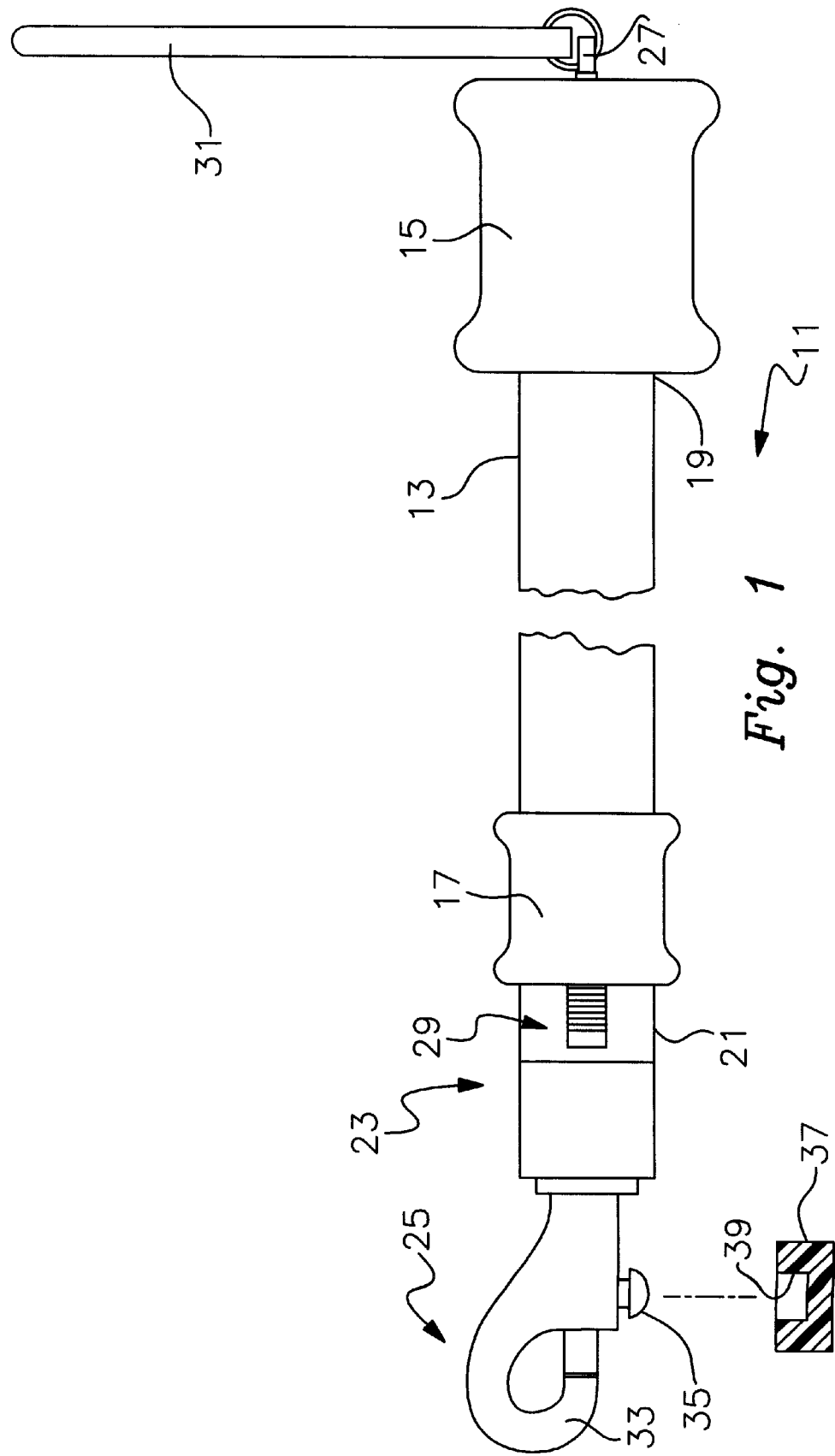
FIG. 1 is a side view illustrating one embodiment of an improved animal leash in accordance with the teachings of the present invention.

Referring to FIG. 1, a side view is provided of one embodiment of an improved animal leash, generally indicated at 11. The leash 11 has a shaft 13 provided with a first grip 15 located at a distal end 19 of the shaft 13 and a second hand grip 17 at a proximal end 21 of the shaft 13. As will be more fully discussed hereinafter, the leash 11 further includes a quick release and attachment connector, generally indicated at 23, for connecting and disconnecting an animal collar fastener, generally indicated at 25, to the shaft 13.

A release button 27 is provided for disengaging the quick release and attachment connector 23 from the shaft 13 to permit the detachment of the animal collar fastener 25 from the shaft 13. A safety, generally indicated at 29 is also provided for preventing the inadvertent release of the connector 23 if the release button 27 is pressed. In addition, a looped strap 31 is provided at the distal end 19 of the shaft 13 in which an animal handler inserts a hand to prevent release of an animal if the improved animal leash 11 is pulled from the hand of the animal handler.

In the embodiment of the invention illustrated by FIG. 1, the animal collar fastener 25 comprises a spring-loaded hook 33 having a small protuberance 35 that an animal handler moves against the bias of a spring (not shown) in order to open the hook 33. The improved animal leash 11 further comprising an overlay button 37 (shown in cross-section) that increases the size of the protuberance 35 to make it easier to manipulate with a persons hand or finger. The overlay button 37 is made of any suitable material, such as rubber, metal, wood, plastic or an elastomer, and has, for example, a cavity 39 for receiving and holding the protuberance 35 in, for example, a force-fit manner. The button 37 is, for example, substantially cylindrical or any other shape suitable for its intended purpose, and is force-fitted over or otherwise suitably attached to the protuberance 35 of the spring-loaded hook 33, for example, using an adhesive or the like, to assist in the opening of the hook 33 by increasing the size and friction grip of the protuberance 35.

In addition, the shaft 13 is preferably substantially rigid and can be made extendible if desired. This is an important advantageous feature of the present invention because the use of an elongated, substantially rigid leash shaft 13 provides greater control of a leashed animal during training and while walking. A rigid shaft 13 allows the handler to keep the leashed animal away from the handler'body and legs as well as increases the control of handler over the animal in crowded areas where the animal may try to lunge at a moving object. In addition, the ability of the animal to build-up a certain amount of momentum before being restrained is eliminated.

In addition to the foregoing, the shaft 13 is constructed of materials that are relatively light weight and yet strong, such as, for example, aluminum, copper, stainless steel, fiber glass, graphite, and plastics such as TEFLON, nylon, polyethylene, polypropylene as well as rubber or wood. In addition, these material permit the use of a variety of different construction techniques, such as the use of solid or tubular shaft construction, which can further reduce the weight of the animal leash 11 and still preserve the strength needed to maintain good control over the leashed animal. Moreover, the material used to construct the leash can be decorated with colors or lights (not shown) to enhance the overall appearance of the leash.

Figure 2:
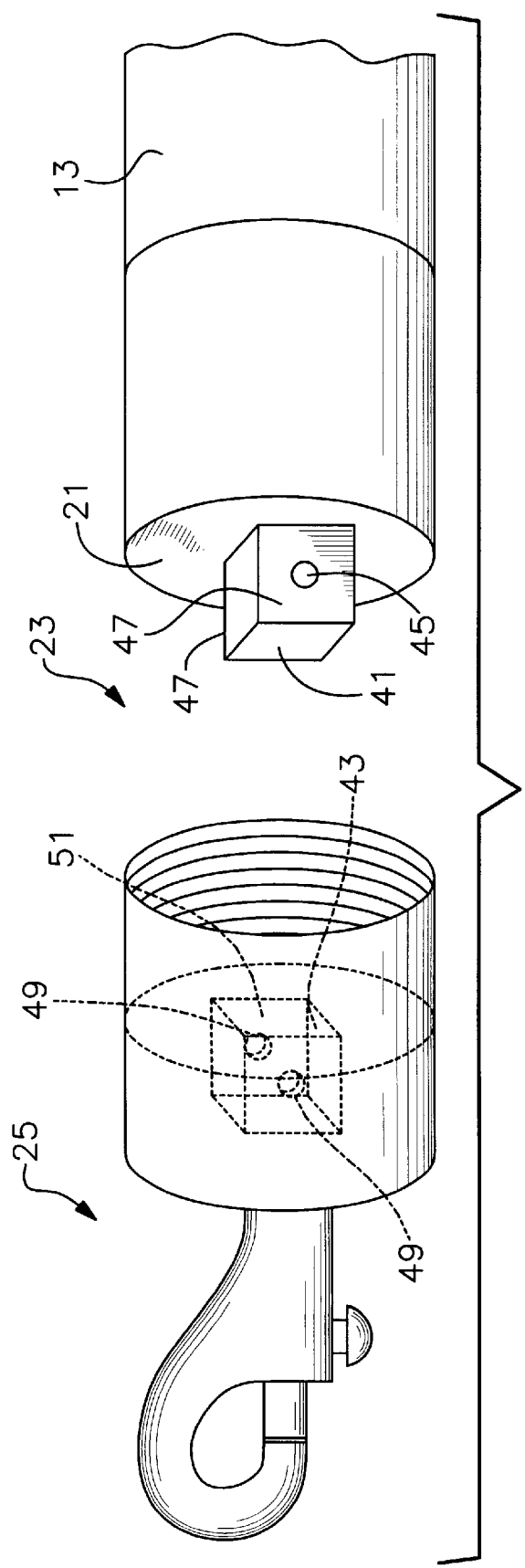
FIG. 2 is a perspective view revealing the general operation of one embodiment of the quick release and attachment connector of the present invention.

Referring to FIG. 2, one embodiment of the quick release and attachment connector 23 is illustrated with the animal collar fastener 25 detached from the shaft 13. For the sake of clarity, the safety 29 and second hand grip 17 are not illustrated in this Figure. As shown in FIG. 2, the proximal end 21 of shaft 13 is telescopically received into the animal collar fastener 25, as will become more apparent with particular reference to the discussion regarding the structure and operation of safety 29.

The connection 23 utilizes, for example, a detent mechanism, such as disclosed by U.S. Patent 6,044,730, the entire disclosure of which is herein incorporated by reference, to attach and quickly release the animal collar fastener 25 to the shaft 13. The connector 23 includes a projection 41 extending from the proximal end 21 of the shaft 13 which is received by and held in a complementary recess 43 provided at the end of the animal collar fastener 25 juxtaposed to the proximal end 21 of the shaft 13. The projection 41 is provided with a retractable ball 45 protruding from at least one side wall 47 of the projection 41. When the projection 41 is inserted into the complementary recess 43, the retractable ball 45 is received by and held in complementary indentation 49 provided in a corresponding side wall 51 of the complementary recess 43 to securely hold the animal collar fastener 25 to the proximal end 21 of shaft 21 until the release button 27 at first hand grip 15 positioned at the distal end 19 of the shaft 13 is depressed.

Figure 3:
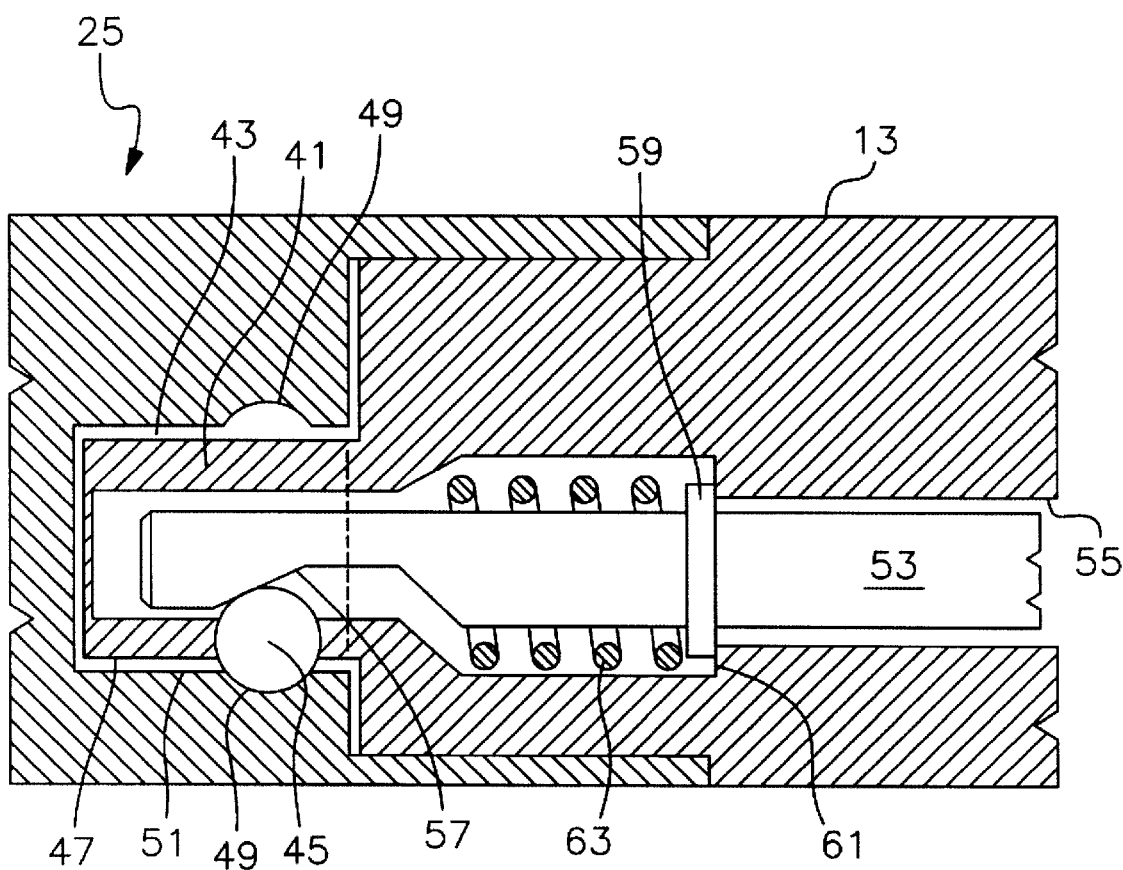
FIG. 3 is a top, sectional view of the embodiment of the quick release and attachment connector illustrated in FIG. 2.

Referring to FIG. 3, a top, sectional view of the quick release and attachment connector 23 is illustrated for the purpose of explaining its operation, however, for the sake of clarity, only one retractable ball 45 is illustrated. The connector 23 uses a control rod 53 that slidably extends through, for example, a bore 55 from the release button 27 through the shaft 13 to the projection 41 at the proximal end 21 of the shaft 13. The control rod 53 has a ramp 57 that bears against the retractable ball 45 and a stop 59 which is forced by spring 63 so as to abut an abutment 61 during quiescent conditions.

Since the control rod 53 is biased by spring 63 against abutment 61 under quiescent conditions, the ball 45 rests against a less recessed portion of the ramp 57. As a result, the ball 45 is unyieldably held so as to protrude partly from the side wall 47 of the projection 41 and into complementary indentation 49 to positively retain and connected the animal collar fastener 25 to the shaft 13.

By pressing release button 27, the rod 53 slides towards the animal collar fastener 25 so that a more recessed portion of the ramp 57 of the control rod 53 is positioned at the ball 45. As a result, the ball 49 can move entirely inside the projection 41 so as to disengage from the complementary indentation 49 and allow the animal collar fastener 25 to quickly disengage from the shaft 13.

In order to make the shaft 13 extendible, the shaft 13 is made of two or more telescopic segments and the release button 27 need only be moved forward along the shaft be converted to a slide-like release mechanism similar to the button used for the safety disclosed in FIGS. 4 and 5 discussed below.

Figure 4:
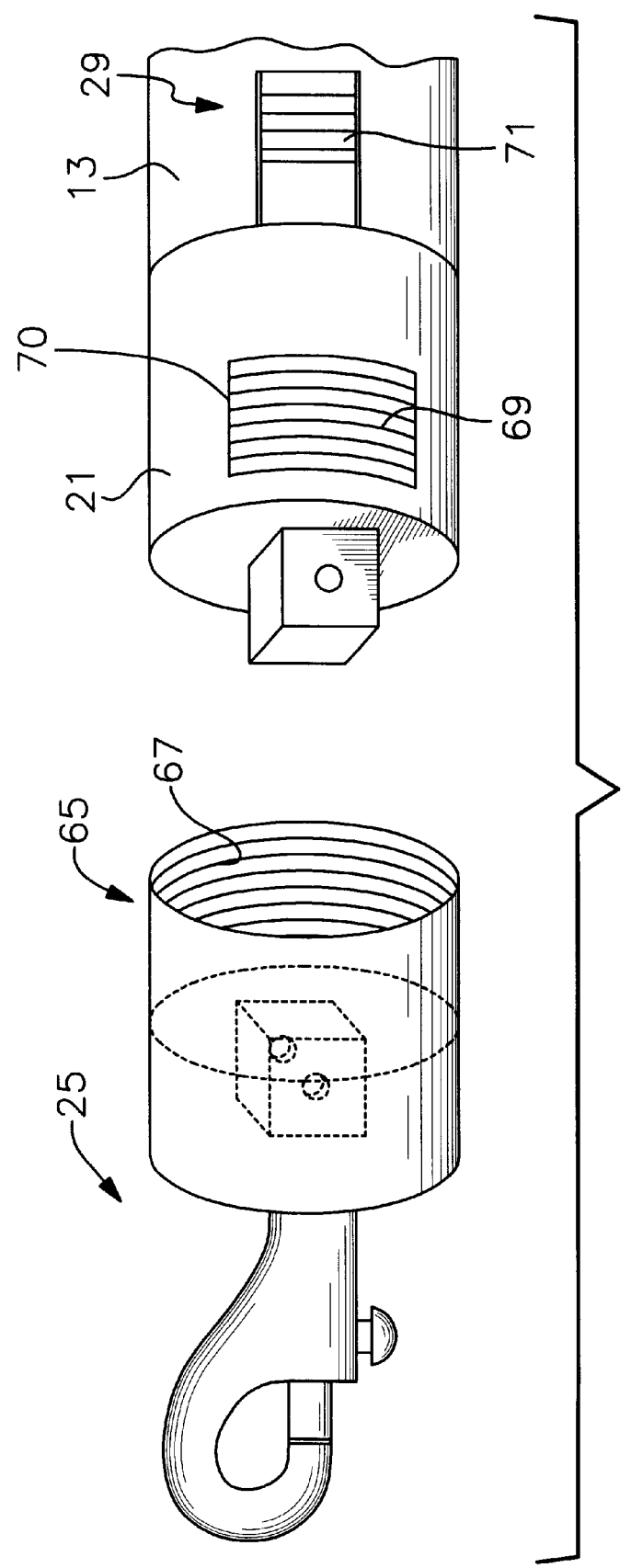
FIG. 4 is a perspective view illustrating one embodiment of the safety for preventing inadvertent release of the animal collar fastener from the shaft of the leash of the present invention.

Referring to FIG. 4, the structure and operation of the safety 29 will now be discussed. As previously noted, the proximal end 21 of shaft 13 is telescopically received into the animal collar fastener 25. More specifically, the animal collar fastener 25 has a hollow portion, generally indicated at 65, into which the proximal end 21 of the shaft 13 is received. A plurality of ridges and valleys or substantially saw tooth serrations 67 are formed on the interior surface of the hollow portion 65. Complementary saw tooth serrations 69 extend through an opening 70 provided at that portion of the proximal end 21 of the shaft 13 which is received by the hollow portion 25 of the animal collar fastener 25. The saw tooth serration 69 are preferable positioned on opposite sides of the portion of the proximal end 21 which is inserted into the hollow portion 65.

When the proximal end 21 of the shaft is inserted into the hollow portion 65 of the animal collar fastener 25, the saw tooth serrations 69 extending out of the shaft 13 are designed to yield inwardly to permit the serration 69 to retract somewhat and slide over the serrations 67 on the interior surface of the hollow portion 65 so that the animal collar fastener 25 can be attached to the shaft 13 as described above. However, once the animal collar fastener 25 is attached to the shaft 13, a switch 71, movable, for example, along the longitudinal axis of the shaft 13, is activated to lock serrations 69 in an outwardly extending position to provide a safety mechanism which prevents release of the animal collar fastener 25 from the shaft if the release button 27 is accidentally pushed.

Figure 5:
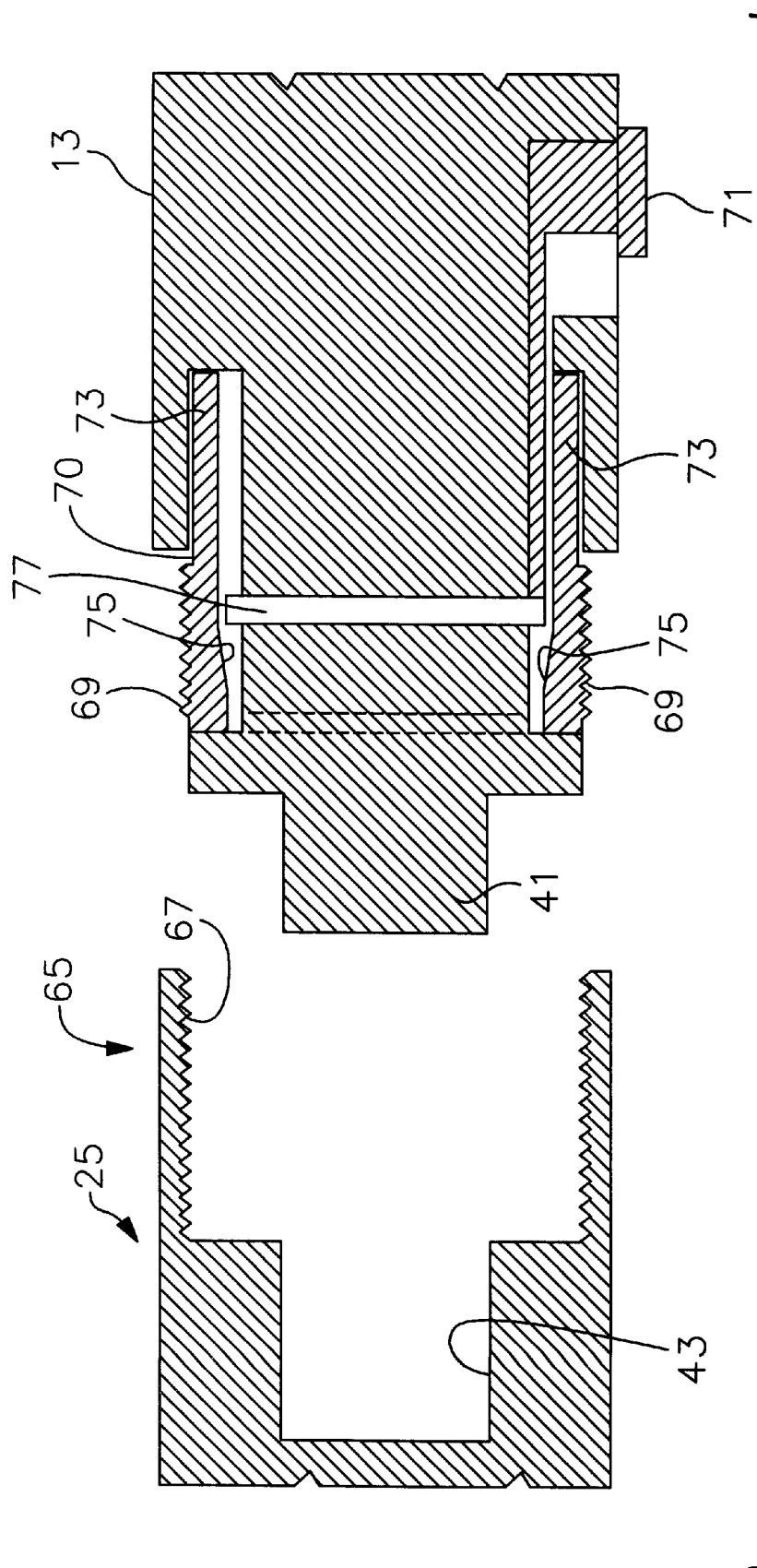
FIG. 5 is a side view, in partial cross-section, illustrating elements of the safety of FIG. 4.

Referring to FIG. 5, one embodiment of the safety 29 is illustrated with the safety 29 in the off position. As shown, the serrations 69 extending through openings 70 are carried by cantilevered supports 73 that bend inwardly when the safety is off. The interior surface of each of the cantilevered supports 73 slope inwardly to form a camming surface 75. To turn the safely 29 on, an annual ring 77 (not shown in cross-section) is moved from the position shown in FIG. 5 to the position shown in dashed lines by sliding button 71 toward the proximal end 21 of the shaft 13. As a result, the annual ring 77 engages the camming surface 75 of each of the cantilevered supports 73 and prevents the cantilevered supports 73 from bending inwardly. Thus, serrations 69 are locked in the outward position so that serrations 67 are firmly engaged and animal collar fastener 25 is attached to the proximal end 21 of the shaft 13.

Figure 6:
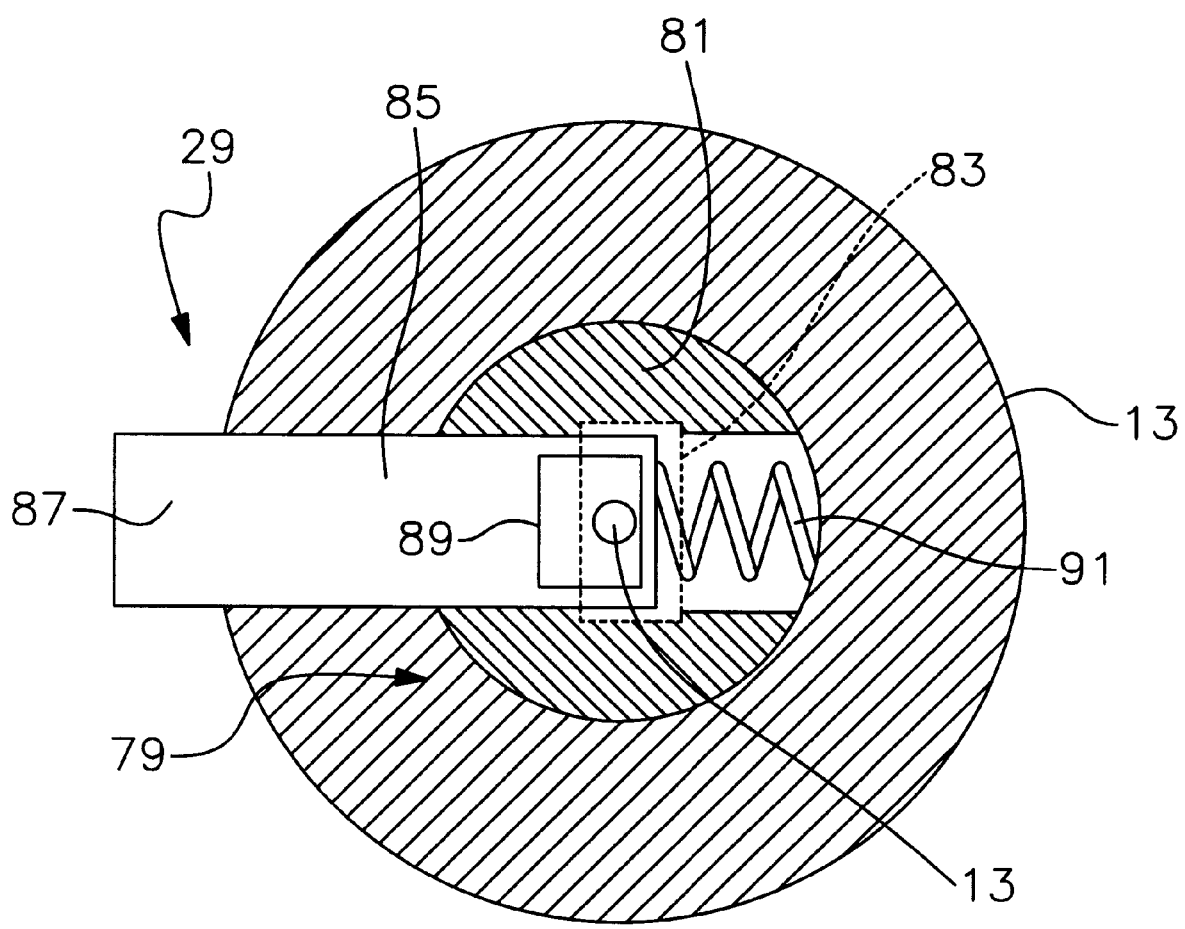
FIG. 6 is a cross-sectional view of a further embodiment of the safety.

FIG. 6 illustrates a further embodiment of the safety 29 wherein a spring loaded clamp, generally indicated at 79, is employed to clamp the control rod 53 in place and prevent movement thereof. The spring loaded clamp 79 is well known in the art and comprises outer body 81 having an opening 83 through which the control rod 53 extends. The outer body 81 slidably receives a slide 85 that forms a safety button 87 at its distal end. The slide 85 has an opening 89 through which the control rod 53 also extends. A spring 91 forces the slide 85 outwardly so that the control rod 53 is clamped between the edges of the openings 83, 89 to prevent the control rod 53 from moving thereby preventing inadvertent release of the animal from the leash 11. By pressing and holding safety button 87 against the bias of the spring 91, the control rod 53 is released from the clamping action of the clamp 79 so that the control rod 53 can now slide and the animal can be released from the leash if so desired.

While consider emphasis has been placed herein on preferred embodiments of the invention and specific structures and structural interrelationships of the component parts thereof, it will be readily apparent that many embodiments of the invention can be made, and that many changes can be made in the embodiments herein illustrated and described without departing from the principles of the invention. Accordingly, it is to be distinctly understood that the foregoing descriptive matter is to interpreted merely as illustrative of the invention and not as limitation.

What I claim is:

1. An improved animal leash comprising:
   a shaft;
   a pair of hand grips respectively located at a distal end of the shaft and at a proximal end of the shaft;

a quick release and attachment connector located at the proximal end of the shaft for connecting and disconnecting an animal collar fastener to the shaft;

a release button for releasing the quick release and attachment connector from the shaft to permit the detachment of the animal collar fastener from the shaft; and a safety located on the shaft for preventing the inadvertent release of the connector if the release button is pressed.

2. An improved animal leash according to claim 1, wherein the shaft is substantially rigid.

3. An improved animal leash according to claim 1, wherein the hand grip located at the distal end of the shaft is a pistol grip.

4. An improved animal leash according to claim 1, wherein the quick release and attachment connector comprises a ball detent mechanism for connecting the animal collar fastener to the rigid shaft until the release button is activated.

5. An improved animal leash according to claim 1, wherein the release button is located at the distal end of the shaft.

6. An improved animal leash according to claim 1, wherein the safety is located at the proximal end of the shaft.

7. An improved animal leash according to claim 1, further comprising a looped strap at the distal end of the shaft in which an animal handler inserts a hand to prevent release of an animal if the improved animal leash is pulled from the hand of the animal handler.

8. An improved animal leash according to claim 1, wherein the animal collar fastener comprises a spring-loaded hook having a small protuberance that an animal handler moves against the bias of a spring in order to open the hook.

9. An improved animal leash according to claim 8, further comprising an overlay button that is attached to and over the protuberance of the spring-loaded hook to assist in the opening of the hook by increasing at least one of the size and friction grip of the protuberance.

10. An improved animal leash according to claim 1, wherein the shaft is hollow tube.

11. An improved animal leash according to claim 1, wherein the shaft is a solid rod.

12. An improved animal leash according to claim 1, wherein the shaft is made of aluminum, copper, steel, fiber glass, graphite, teflon, plastics, rubber or wood.

13. An improved animal leash according to claim 1, wherein the shaft has a decorative color.

14. An improved animal leash according to claim 1, wherein the shaft is decorated with lights.

15. An improved animal leash comprising:

a substantially rigid shaft;

a pair of hand grips, one of the pair being a pistol grip located at a distal end of the rigid shaft and the other of the pair being a hand grip located at the proximal end of the rigid shaft;

a quick release and attachment connector connecting an animal collar fastener to the proximal end of the rigid shaft;

a release button located at the pistol grip, for releasing the quick release connector from the shaft; and a safety located near the hand grip at the proximal end of the shaft for preventing the inadvertent release of the connector if the release button is pushed.

16. An improved leash according to claim 15, further comprising a looped strap at the distal end of the shaft in which an animal handler inserts a hand to prevent release of an animal if the improved animal leash is pulled from the hand of the animal handler.

17. An improved animal leash according to claim 15, wherein the animal collar fastener comprises a spring-loaded hook having a small protuberance that an animal handler moves against the bias of a spring in order to open the hook.

18. An improved animal leash according to claim 17, further comprising an overlay button that is attached over the protuberance of the spring-loaded hook to assist in the opening of the hook by increasing at least one of the size and friction grip of the protuberance.

19. An improved animal leash according to claim 15, wherein the shaft is either a hollow tube or a solid shaft made of aluminum, copper, steel, fiber glass, graphite, teflon, plastics, rubber or wood.

20. An improved animal leash according to claim 15, wherein the shaft has a decorative color.

21. An improved animal leash according to claim 15, wherein the shaft is decorated with lights.

* * * * *